United States Patent [19]
Bharucha et al.

[11] Patent Number: 5,457,684
[45] Date of Patent: Oct. 10, 1995

[54] DELAY-LESS SIGNAL PROCESSING ARRANGEMENT FOR USE IN AN ATM NETWORK

[75] Inventors: Behram H. Bharucha, Millburn; Charles W. K. Gritton, North Brunswick; Dario L. Parola, Matawan; Richard Zoccolillo, Holmdel, all of N.J.

[73] Assignee: AT&T IPM Corp., Coral Gables, Fla.

[21] Appl. No.: 171,310

[22] Filed: Dec. 21, 1993

[51] Int. Cl.$^6$ .............................. H04L 12/56; H04L 12/64
[52] U.S. Cl. .................... 370/60.1; 370/94.2; 370/110.1; 370/79
[58] Field of Search .............................. 370/13, 60, 60.1, 370/94.1, 94.2, 58.1, 58.2, 58.3, 110.1, 32, 32.1, 79, 110.2, 110.3; 379/406, 410

[56] References Cited

U.S. PATENT DOCUMENTS

| | | | |
|---|---|---|---|
| 4,956,839 | 9/1990 | Torii et al. ............................. | 370/60 |
| 5,070,498 | 12/1991 | Kakuma et al. ....................... | 370/60 |
| 5,144,619 | 9/1992 | Munter .................................. | 370/60.1 |
| 5,204,854 | 4/1993 | Gregorian et al. .................... | 370/32.1 |
| 5,204,857 | 4/1993 | Obara .................................... | 370/60.1 |
| 5,274,635 | 12/1993 | Rahman et al. ....................... | 370/60.1 |
| 5,301,189 | 4/1994 | Schmidt et al. ....................... | 370/60.1 |

OTHER PUBLICATIONS

IEEE 1990 International Symposium on Circuits & Systems; vol. 4, "A Speech Processing LSI for ATM Network Subscriber Circuits", Y. Shoji et al, pp. 2897–2900.
Globecom '89, IEEE Global Telecommunications Conf & Exhibition, 1989, "Voice Transport on an ATM Broadband Network", W. O. Covington et al, pp. 1921–1925, vol. 3.

Primary Examiner—Wellington Chin
Attorney, Agent, or Firm—Frederick B. Luludis

[57] ABSTRACT

An ATM cell carrying a voice-band signal originating in an STM network is processed in accordance with a particular signal processing function in an ATM mode at an ATM data rate without incurring a delay penalty that arises.

11 Claims, 4 Drawing Sheets

DELAY-LESS SIGNAL PROCESSING ARRANGEMENT FOR USE IN AN ATM NETWORK

FIELD OF THE INVENTION

The invention relates to performing a signal processing function in an Asynchronous Transfer Mode (ATM) network that may be interposed in an STM network.

BACKGROUND OF THE INVENTION

A telephone station set is typically connected to a telephone network via two wires. When a call is placed from the telephone station set, then the network typically converts the two wires to a four-wire connection through the telephone network and then back to two wires extending to a called telephone station. The conversion from two wires to four wires and vice-versa is usually achieved using a so-called hybrid, which is typically a source of echo signals. To deal with echo signals, the four-wire network connection may include a signal processing function to effectively "cancel out" such echo signals. A telephone network may include other signal processing functions, such as the detection of Dual Tone MultiFrequency (DTMF) signals entered by a user.

Presently, a telephone network operates in a so-called Synchronous Transfer Mode (STM) to transport speech signals over a network connection in digital form. That is, the telephone network samples an analog voice signal that it receives at an input at an 8 kHz rate and transports the resulting 64 Kbps signal synchronously over an associated network connection to an output. At the output, the digital signal is converted to an analog signal. Since an STM network operates in a synchronous mode, signal processing functions may be performed synchronously. For example, consider the signal processing function of echo cancellation. As mentioned above, a so-called hybrid is usually the source of an echo, as illustrated in FIG. 1. Assume that speech signals are transported from left-to-right via two wire path 3 into hybrid 5. As a result of an impedance mismatch, hybrid 5 reflects a portion of the speech energy over two wire path 4, thereby causing an echo of the speech signal to be transported in the opposite direction toward the talking party. However, echo canceler (EC) 2 estimates the waveform of the reflected signal carried over path 4 and presents the result to an EC 2 subtracter (sub), which then subtracts the estimated waveform from the actual waveform of the signal carried over path 4. If the estimate is close to the actual waveform, then the echo component of the signal is effectively canceled at the subtracter (sub) of EC 2.

This signal processing function is made possible in an STM network as a result of being able to present the echo signal to the EC 2 subtracter via path 4 at some time after the true speech signal has arrived at EC 2 via path 3. The time difference between the two signals is referred to herein as echo return path delay. An example of such a delay is shown in FIG. 2, in which, digital signal 6 represents a sample of speech that is transported over path 3, and is formed from a number of bits, e.g., eight bits. Digital signal 7, on the other hand, represents an echo of signal 6 that has been reflected in the opposite direction over path 4. As shown, a delay of Δt exists between the two signals. In addition, the delay is essentially constant over successive pairs of similar signals as a result of the network operating in a synchronous mode. This constant delay, more accurately the time invariant characteristic of the echo path observed by the echo canceler, allows the ready implementation of the cancellation function.

The relevant technology has recently seen the introduction of what is commonly referred to as a Asynchronous Transfer Mode (ATM) network, which is formed from a plurality of ATM switches and other ATM equipment. An ATM network may operate at, for example, a 2.4 GHz clock rate, to transport information in the form of a cell comprising 53 octets of 8 bits each octet. Five of the 53 octets form a cell header including a logical channel identifier. The remaining 48 octets form the cell payload. The relevant technology is now turning toward interfacing a STM network with an ATM network. Accordingly, an interface between an STM and an ATM network at one end of a connection would need to pack a segment of the voice signal comprising 48 octets generated in the STM network into an ATM cell for presentation to the ATM network. Such cells are generated periodically, in which the period is 6 milliseconds and is approximately equal to the amount of time needed to collect from the STM network 48 octets of a voice signal sampled at a 125 microsecond clock rate. The ATM network then transports the cell to the opposite end of the connection, which may also interface with an STM switch. At that point, the interface performs a complimentary function.

Although successive cells corresponding to a voice connection enter the ATM network periodically every 6 milliseconds, various ATM operations, such as cell switching, perturb the temporal location of the voice cells. As a result, when successive cells of the voice connection are observed at a particular point within the ATM network, e.g., where the cells exit from the ATM network, then it may be seen that the interval between cells may not be exactly 6 milliseconds. This departure from strict periodicity is referred to herein as cell jitter.

We have recognized that in certain instances a voice connection through STM and ATM networks may not include conventional signal processing functions, such as, for example, DTMF detection, echo cancellation, signal enhancement, etc. As such, the absence of such a signal processing function may affect adversely the quality of the service. This problem may be dealt with by implementing the signal processing function in the ATM network. That is, converting a received cell whose contents represents speech, or other signals in the speech band, into an STM format, performing the signal processing function and then converting the result to the ATM format. This would entail "depacketizing" the ATM cell by presenting each octet forming the payload sequence to the signal processing function at the STM sampling rate of 8 KHz, i.e., 125 microseconds for each octet. In addition, the incoming data cells would need to be stored in a "smoothing" buffer to deal with cell jitter, which may be as long as two milliseconds, and guarantee that an octet can be presented to the STM signal processing function every 125 microseconds. After the signal processing function is performed, the octets must then be "repacketized" into ATM cells, as mentioned above. It can be appreciated that it would take six milliseconds to accumulate 48 octets to form the payload of an ATM cell. Thus, as a result of such jitter and repacketizing eight milliseconds of delay could be introduced in the delivery of an ATM cell to its intended destination.

SUMMARY OF THE INVENTION

We have recognized that irrespective of the fact that ATM cells in traveling one direction of a connection arrive at a point noncoincidentally to a cell arriving in the opposite direction, an echo canceling function may still be performed on cells whose contents originated in an STM network without converting such contents to an STM format and incurring a delay penalty. Such processing may be achieved, in accord with an aspect of the invention, by internally aligning the data when it is received over the two paths in the echo canceler and, upon achieving such alignment, performing the echo canceller function at a high clock rate.

The inventive technique may be extended to other signal processing functions without converting the ATM cells to an STM format and incurring a delay penalty associated with such conversion.

DETAILED DESCRIPTION

Figure 1:
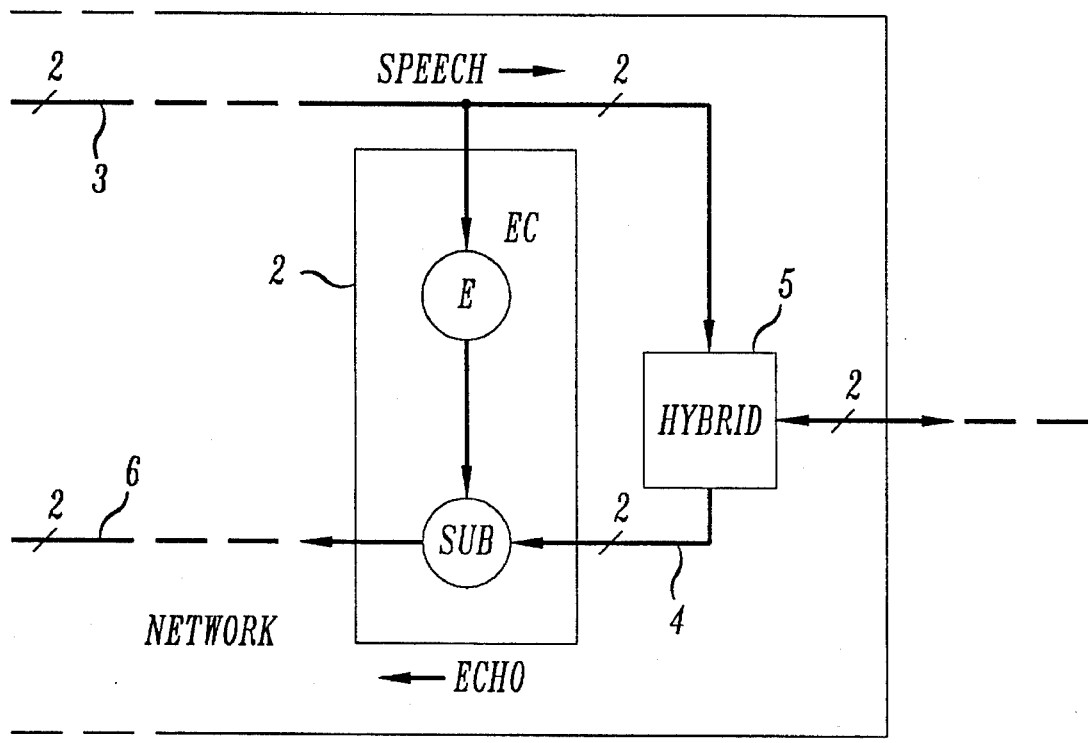
FIGS. 1 and 2 show in broad block diagram form a particular signal processing function in an STM network and the level of jitter that may occur in an STM network.
Figure 2:
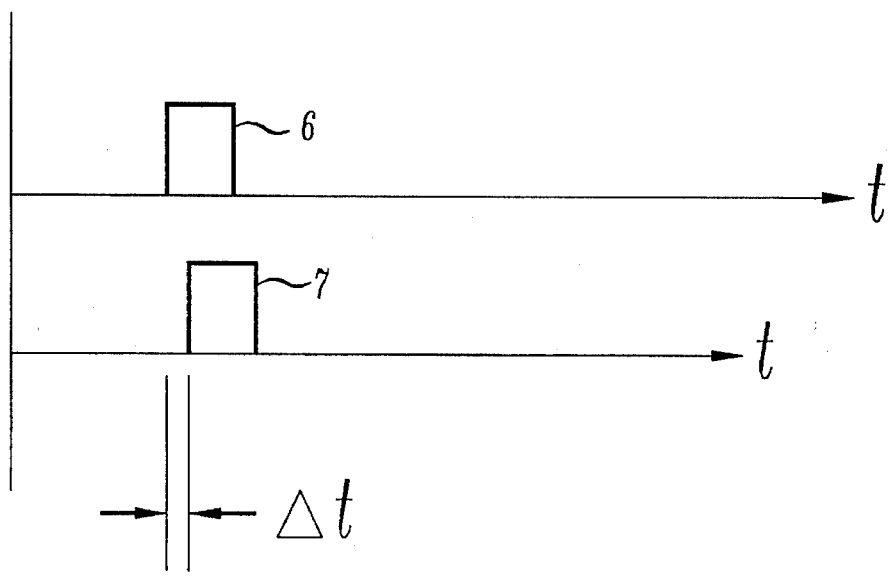
Figure 3:
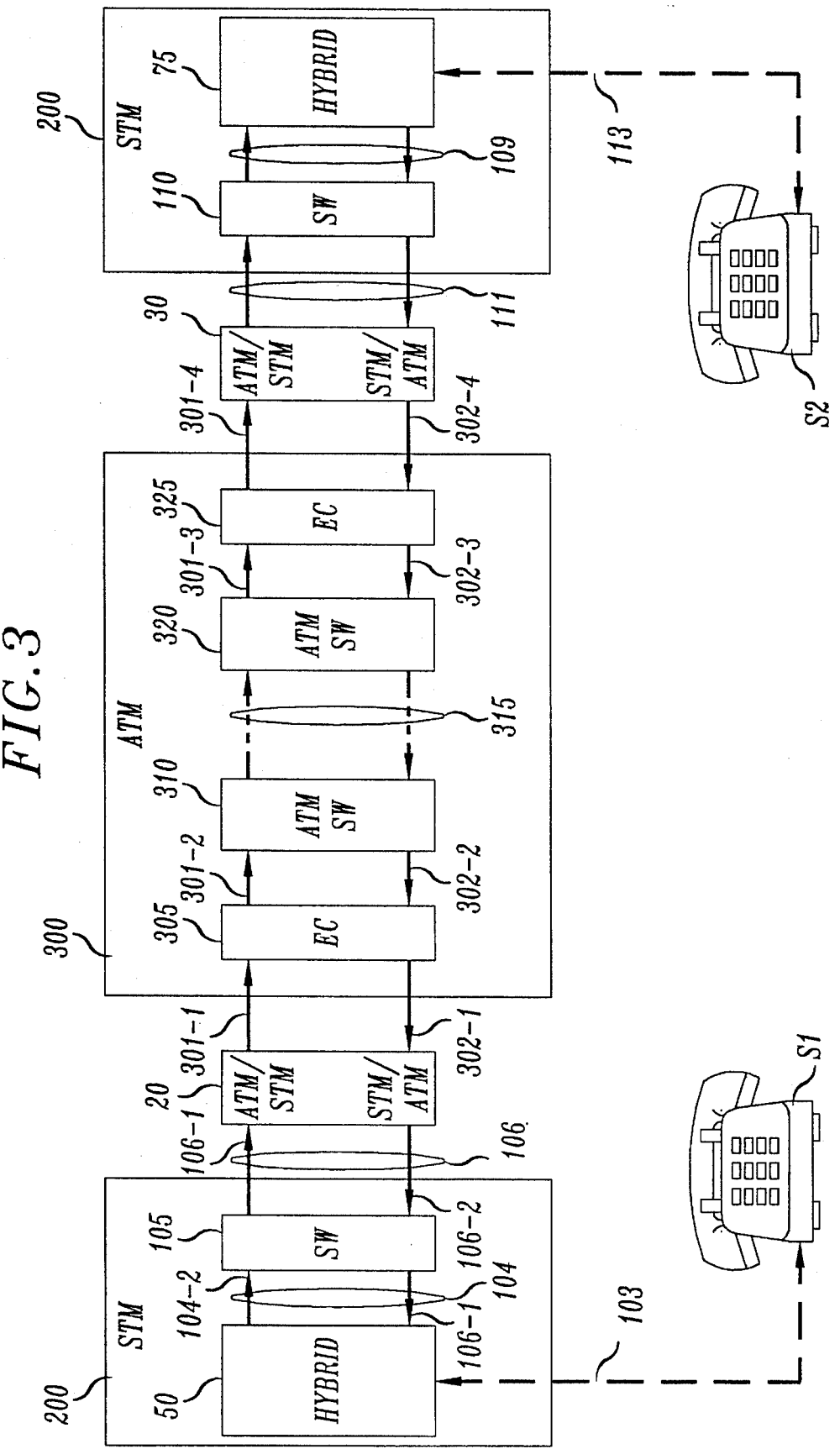
FIG. 3 shows in broad block diagram form an ATM network disposed between two STM switches of an STM network in which the principles of the invention may be practiced in an ATM switch of FIG. 3.

Turning now to FIG. 3, there is shown an example of an STM interexchange network 200 interfacing with ATM network 300 for the purpose of transporting voice-band signals from switch 105 to switch 110 of STM network 200 and vice-versa. Typically, the switches, e.g., switches 105 and 110, form an STM network in which the switches may be, e.g., the well-known No. 5ESS (trademark of AT&T) switch. It may also be a private network comprising a plurality of customer premises equipment e.g., private branch exchange. ATM network 300, on the other hand, includes a plurality of ATM equipments, two of which are shown in the FIG., namely switches 310 and 320. Switches 310 and 320 are interconnected to one another via a high speed transmission path 315. The network also includes equipment for performing a number of different signal processing functions on ATM cells carrying digitized voice-band signals. As mentioned above, one such function is echo cancellation, as illustrated by Echo Cancelers (EC) 305 and 325. It is seen from the FIG. that STM/ATM converter 20 is interposed between STM switch 105 and ATM network 300 via four-wire connection 106. Similarly, STM/ATM 30 converter is interposed between switch 110 and ATM network 300 via four-wire connection 111. Specifically, converter 20 packs STM voice signals that it receives via path 106-1 into an ATM cell having a payload of 48 octets of voice information, as mentioned above. Converter 20 then supplies the resulting ATM cell via path 301-1 and EC 305 to a switch 310. Conversely, converter 20 "unpacks" an ATM cell that it receives via path 302-1 and supplies each of the 48 unpacked octets forming the cell payload to path 106-2 for delivery to network 200. Converter 30 performs a similar function with respect to STM and ATM formatted signals exchanged between networks 200 and 300 via path 111.

Specifically, assume that an ATM cell that is presented to EC 305 via path 301-1 contains an echo of a voice signal which originated as a result of a voice signal that is transmitted by station $2 to switch 110 via two-wire path 113 and hybrid 75, which converts path 113 to four-wire path 109. The voice signal is then transmitted over a connection through switch 110, network 300 and switch 105 and thence to hybrid 50 via path 104-1 of four-wire path 104. Similarly, hybrid 50 converts four-wire path 104 to two-wire path 103. Due to imperfect impedance matching, a portion of the voice signal transmitted by station S2 and presented to hybrid 50 via path 104-1 is coupled to path 104-2, which is returned via the opposite path as the aforementioned echo. A portion of the voice signal is also coupled to two-wire path 103 extending to station S1.

EC 305, upon receipt, via path 301-1, of the ATM cell carrying the echo signal, immediately subtracts an estimate characterizing the echo from an ATM cell carrying a voice signal via path 302-2. EC 305 derives such an estimate using a particular algorithm, as will now be discussed below in conjunction with FIG. 4.

In particular, EC 305 includes a High Pass Filter (HPF) 401 which removes (filters) DC components that might be present in the voice-band signal in the ATM cells that are received via path 302-2. The filtered signal is then stored immediately in buffer 402 to await receipt of an ATM cell carrying a voice signal via path 301-1. It is also supplied immediately to path 302-1 so as to not delay the delivery of the contents of the cell to its ultimate destination, e.g., station set S 1. A cell received via path 302-2 is formed at STM/ATM converter 30 (FIG. 3) and transported to EC 305 independently of a cell received via path 301-1, which is formed at STM/ATM converter 20 (FIG. 3). Accordingly, an ATM cell may not arrive via path 302-2 at the same time that a cell arrives via path 301-1. To deal with that problem, an ATM cell that is received via path 302-2 is stored in buffer 402 that is sufficiently large to guarantee that it will be available for immediate processing when a cell arrives via path 301-1. When an ATM cell does arrive via path 301-1 via high pass filter (HPF) 414, it is loaded immediately in parallel into buffer 410 and then immediately "clocked out" by clock signal CLKG. Buffers (registers) 402 and 410, more particularly, operate at a clock rate which may be different from the clock rate that is associated with the arrival of a cell via path 302-2 and 301-1, respectively. That is, the contents of those registers is processed at a clock rate CLKG, which may be different than the clock rate associated with the arrival rate of a cell via path 302-2 or 301-1. Buffer 410 is required only if the rate of clock CLKG is different than from the rate that cell arrival.

Specifically, the receipt of a cell via path 301-1 triggers the gate function 412, which, in turn, enables one input of logic AND gate 413. The other input of AND gate 413 connects to oscillator 411, which generates a high-speed clock signal, e.g., a 56 MHz clock signal. The enabling of AND gate 413 thus allows the output of gate 413 to effectively replicate the high speed clock signal on lead CLKG, which is presented to a number of other circuits contained within the EC, as shown in the FIG.

Buffer 410 responsive to each cycle of the clock signal on lead CLKG outputs an octet, or voice sample, of the ATM cell stored therein to conventional summing circuit 407 arranged as a subtracter circuit. Subtracter circuit 407, in turn, subtracts from the value of the octet received from buffer 410 the estimate of the echo (y) that is derived in a conventional manner on the fly from a corresponding one of the cell octets stored in buffer 402, and the previous N octets that are stored in shift register 404.

The result of the subtraction is then supplied to NonLinear Processor (NlP) 408 and to the e input of coefficient generator 409. Coefficient generator 409, more particularly, updates the value of each of the tap coefficients h0 through hN−1 based on the previous values of those coefficients derived from path 302-2, the normalized gain of the EC, current value of e and value of the respective octet, as shown by the following relationship. Thus, generator 409 generates a new set of tap coefficients for corresponding octets respectively stored registers 402 and 410.

Buffer 402, more particularly, and responsive to clock signal CLKG, outputs an octet of the ATM cell stored therein to shift register 404. The contents of the storage locations forming register 404 are then presented to respective multiplier circuits 405-1 through 405-N, where N is derived from the value of the maximum echo-return-path delay that the EC is designed to process. For example, where the latter delay is 32 milliseconds, then N would be a value of 256.

The current values of the filter tap coefficients h0 through hN−1 are presented as multiplier coefficients to multiplier circuits 405-1 through 405-N, respectively. The results of each such multiplication is then presented to summing circuit 406. The output of summing circuit 406 is then supplied as the aforementioned estimate of the echo to subtracter 407.

The foregoing processing continues for each ATM octet stored in buffer 410 and proceeds at the CLKG rate. Thus, if the CLKG rate is 50 MHz, then corresponding octets respectively stored in buffers 402 and 410 are processed during an approximately 8 microsecond CLKG period and continues until the last ATM octet stored in register 410 is supplied to subtracter 407. At that point, logic AND gate 413 is disabled, thereby disabling the high-speed clock signal outputted by oscillator 411 from passing to lead CLKG. Accordingly, the foregoing processing is discontinued until the next ATM cell is received via path 301-1.

After having processed a number of such corresponding cells, the EC converges on an estimate of the echo such that an echo arriving via path 301-1 is effectively "canceled", which means that the energy value of the resulting signal (octet) that subtracter 407 outputs to path 301-2 via NLP 408 is minimized.

(Nonlinear processor 408 mentioned above removes residual echo e which is left after the FIR filter 420 has subtracted its estimate e of the incoming echo via lead 301-1. This is done only when the value of residual echo e is below a predetermined threshold value, e.g., 12 dB relative to the signal received via path 302-2.)

It can be appreciated that an ATM cell may be lost before it is received via path 301 or 302. We deal with the loss of a cell, when it is so detected, by substituting a "dummy" or default, cell in place of the lost cell. For example, if a cell is not received via path 302-2 (FIG. 3) then a dummy cell is stored immediately in buffer 402 and is also launched over path 302-1. Similarly, if a cell is not received via path 301-1 (FIG. 3), then a dummy cell is stored immediately in buffer 410 and gate 412 is activated, thereby starting the processing of the dummy cell. A cell loss event may be detected by the tracking of the sequence numbers associated with arriving cells. If the sequence number of a received cell is out of sequence, then it is likely that an intervening cell was lost. If the worst case cell jitter is small, e.g., 2 msec, compared with the nominal intercell spacing of six msec, then the call loss event can also be detected by noting that a cell has not arrived after the lapse of a period equal to six msec plus worst case jitter.

Figure 5:
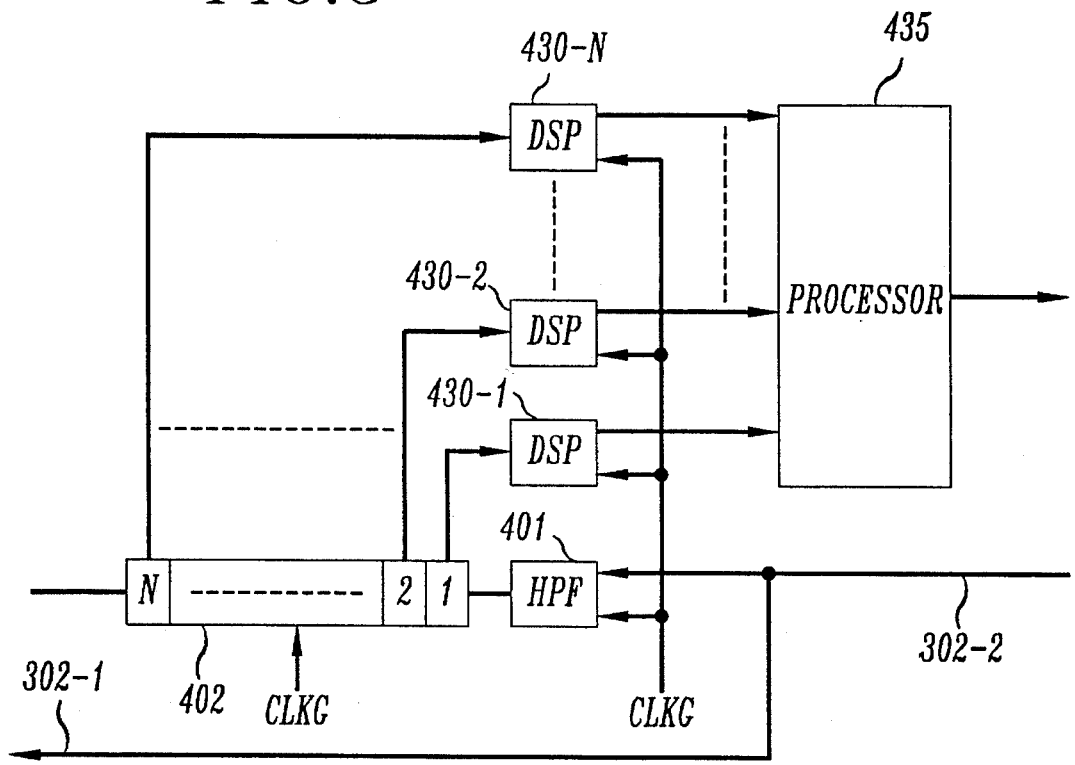
FIGS. 5 and 6 respectively illustrate two other ATM signal processing functions each arranged in accord with the principles of the invention.

As mentioned above, other signal processing functions may be performed in accord with an aspect of the invention. One such signal processing function may be the detection of conventional DTMF tones characterizing a network 200 service request that a subscriber, such as the subscriber associated with station S2, may enter by pressing a particular station S2 keypad button. For example, assume that the station S2 subscriber presses the star sign (*) to request a particular telephone service. Then station S2 transmits the DTMF tone (signal) characterizing the star sign over the associated telephone connection. STM network 200, e.g., switch 110, digitizes the signal and outputs the result for transport to the far end of the connection. Assuming that an ATM network is interposed in the connection as shown in FIG. 5, then the digitized signal is then formed into ATM cells for transport via the ATM network. Upon receipt of a cell via path 302-2, the cell payload is passed through HPF filter 401 and storm in buffer 402. Immediately upon storing the cell in buffer 402, the octets are clocked out by clock signal CLKG and presented to the array of Digital Signal Processors (DSP) 430-1 through 430-N, which also employ the CLKG signal in the processing of the octets, as shown in FIG. 5. Each such DSP processes the octet that it receives to determine the level of energy and frequency (or frequencies) represented by the digital value of the octet. When each DSP completes its respective task, it then supplies the result(s) of its determination to processor 435. Processor 435, in turn, processes the result that it receives from each DSP 430. If processor 435, as a result of such processing, determines that the payload of the cell stored in buffer 402 represents a DTMF tone characterizing a service request, then processor 435 stores that determination in its internal memory. If processor 435 reaches the same determination after a number of successive cells received via 302-2 have been similarly processed, then processor 435 outputs a message identifying, inter alia, the service request and originator of the request. The outputted message may then be delivered to an associated ATM switch or delivered upstream to STM network 200. In the above process, clock signal CLKG is enabled upon receipt of an ATM cell via path 302-2 and is disabled after the last octet in the cell has been processed.

Figure 6:
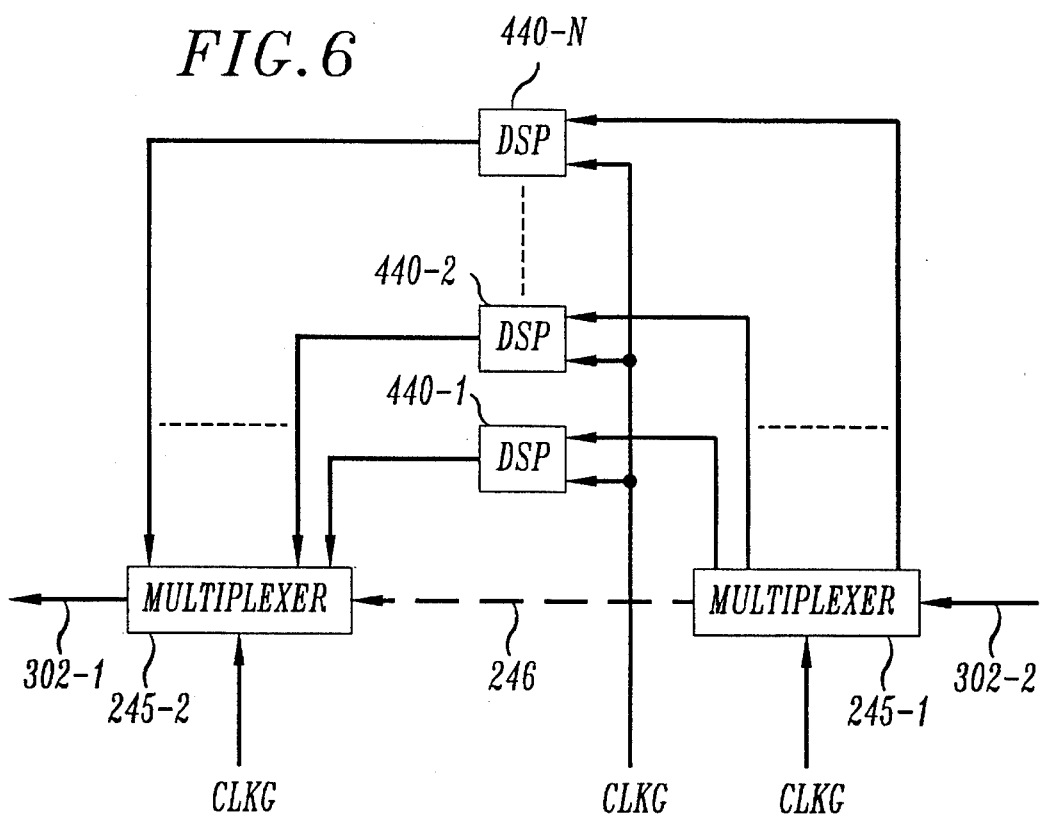

Another such signaling processing function involves enhancing the quality of voice signals, for example, voice signals having frequencies within the range of 100 Hz to 300 Hz. Such enhancement includes, for example, "boosting" the levels of the latter voice signals, as disclosed in U.S. Pat. No. 5,195,132 issued Mar. 16, 1993 to D. W. Bowker et al. As disclosed in that patent, the enhancement is performed in an STM network. However, the enhancement may also be performed, in accord with an aspect of the invention, in an ATM network, as shown in FIG. 6. Specifically, if an ATM cell is representative of voice signals, then the octets forming the cell payload are multiplexed at the CLKG clock rate by multiplexer 245-1 to respectives ones of DSPs 440-1 through 440-N for processing. If that is not the case, then the cell passes directly through multiplexers 245-1 and 245-2 (as represented by the dashed line 246) to path 302-1. As mentioned, each DSP 440 processes a respective octet of a voice cell and does so by determining if the frequency represented by the value of the octet is within the aforementioned range of frequencies. If it is, then the DSP "boosts" the level of the voice sample by changing the value of the associated octet. The DSP then outputs the octet to multiplier 245-2, which then multiplexes the octet with respect to its position in the associated cell to path 302-1 at the CLKG clock rate. If the octet does not represent a voice signal within the aforementioned range of frequencies, then the DSP outputs the octet to multiplexer 245-2 without changing the value of the octet.

Figure 4:
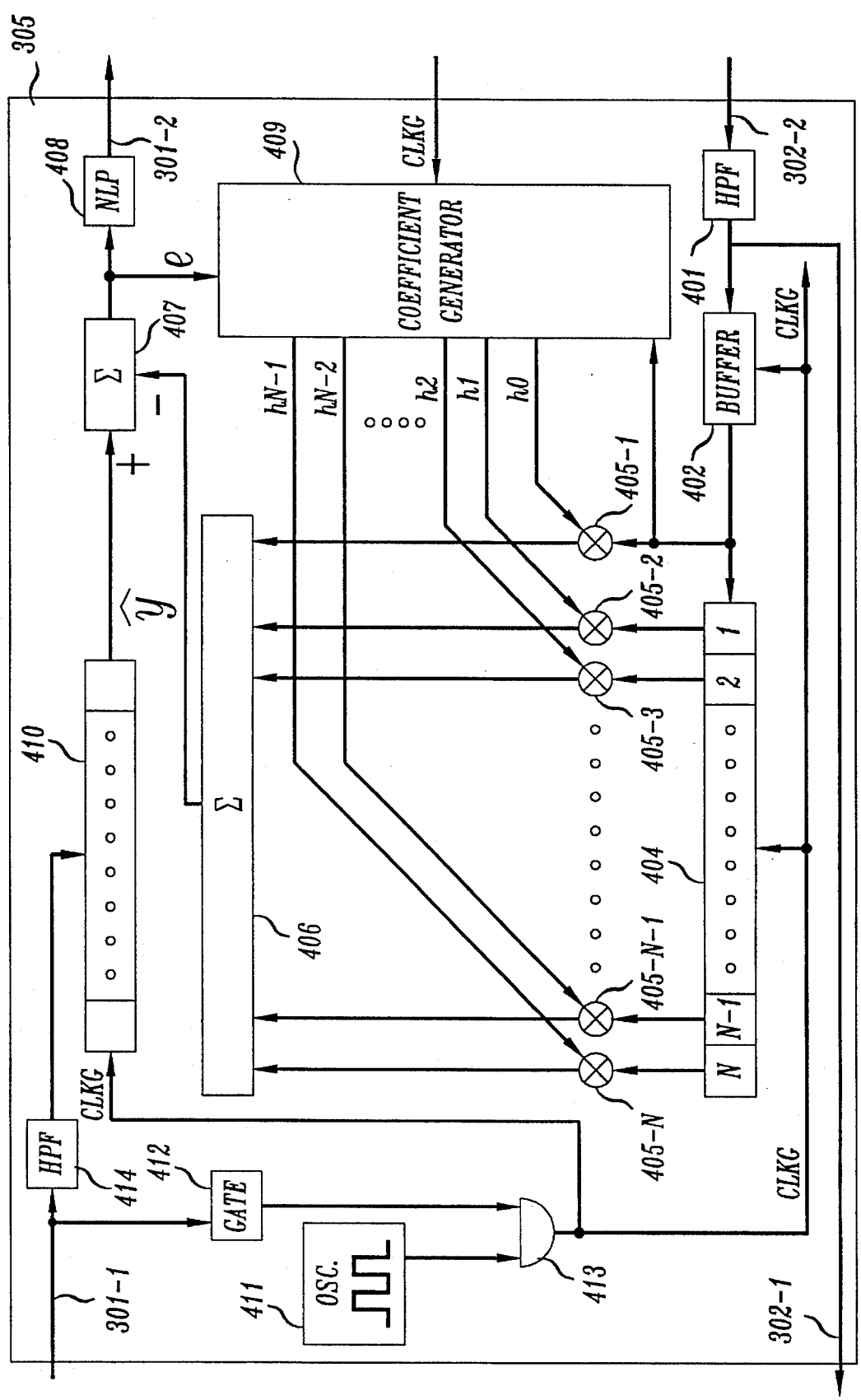
FIG. 4 is an illustrative example of an ATM signal processing function arranged in accord with the principles of the invention.

It is noted that the signal processing functions illustrated in the examples of FIGS. 4, 5 and 6 is done typically using linear PCM words, e.g., 14 bit words. Accordingly, any reference to octets in the discussion of FIGS. 4, 5 and 6 represents linear PCM. Instances should be thought of as representative of the linear PCM. In addition, conversion between the encoded signal used in the cell (e.g., μ-law PCM, ADPCM) and linear PCM is not explicitly shown.

Thus, as seen from the foregoing, signals generated in the STM domain may, in accord with an aspect of the invention, be processed in the ATM domain without sequentially processing each octet forming the cell, in turn, at a 125 microsecond clock rate.

The foregoing is merely illustrative of the principles of the invention. Those skilled in the art will be able to devise numerous arrangements, which, although not explicitly shown or described herein, nevertheless embody those principles that are within the spirit and scope of the invention. For example, although the echo cancellation function is shown in the FIGS. as being external to an ATM switch, it is clear that such echo cancellation may be readily disposed within an ATM switch or within some other ATM equipment. As another example, although the foregoing was discussed in terms of a cell payload of 384 bits being filled with a segment of a 64 Kbps PCM encoded voiceband signal, this may not always be the case. For example, a cell payload may be filled with a segment of a 32 Kbps ADPCM encoded signal, in which case the packetization delay will be 12 milliseconds rather than 6 milliseconds. As another example, the cell payload may be only partially filled with the digitized voice signal from a single conversation, in which the remainder of payload may be used for some other purpose or filled with dummy bits. For example, consider the case where the cell payload is partially filled with 160 bits. In that case then the packetization delay is reduced to 2.5 milliseconds for 64 Kbps encoded signals and 5.0 milliseconds for 32 Kbps signals. As another example, there may not be any STM networking between the hybrid and the ATM network. That is, there may be a 4-wire analog to a 4-wire ATM converter which digitizes the incoming analog signal and places it into an ATM cell, and vice-versa. As another example, although the foregoing was discussed in terms of a fixed size packet (namely an ATM cell with a 5 octet header and a 48 octet payload), it is clear that our invention may be employed in a network that uses a non-fixed size packet or a packet having a header of n bytes and a payload of j bytes, where n and j may be any value greater than one.

We claim:

1. A method of processing a cell in an ATM network node, said node receiving a first cell via a first direction of a bidirectional connection and receiving a second cell via a second direction of said bidirectional connection, said second cell being noncoincidental in time with said first cell, said method comprising responding to receipt of said first cell, by storing a copy of said first cell in a buffer and forwarding said first cell to its intended destination, and responding to receipt of said second cell, by (a) processing the contents of said first and second cells in accord with a predetermined signal processing function, (b) forming the result of said signal processing function into a third cell and (c) forwarding said third cell over said second direction of said bidirectional connection in place of said second cell.

2. The method of claim 1 wherein said signal processing function operates at a clock rate different than a clock rate at which said first and second cells are received.

3. The method of claim 1 wherein said signal processing function includes the step of operating sufficiently fast to minimize a delay between the receipt of said second cell and the forwarding of said third cell.

4. The method of claim 1 wherein first and second STM network switches are the originators of said first and second cells, respectively.

5. The method of claim 1 wherein said signal processing function is an echo cancellation function.

6. A method of processing a cell in an ATM network, said cell containing a payload indicative of a voice-band signal originating at a network TM network generating data samples of a voice-band signal as a result of sampling said voice-band signal at a first clock rate as said voice-band signal is received from a source and forwarding said data samples as they are generated to said ATM network via an interface, said method comprising the steps of at said interface, forming said data samples as they are received at said first clock rate into a cell comprising a series of octets and forwarding said cell when it is formed to said ATM network, at an ATM switch receiving said cell from said interface, storing said cell in a buffer, and supplying, at a second clock rate substantially greater than said first clock rate, the octets to a signal processing function, processing each of said octets in sequence in accordance with said processing function, and forming said octets at a second clock rate into another cell as they are processed and outputted by said signal processing function and then forwarding the other cell to an output.

7. The method set forth in claim 6 wherein said step of processing includes the step of processing said octets in accordance with a voice signal enhancement function.

8. The method set forth in claim 6 wherein said step of processing includes the step of processing said octets in accordance with a dual-tone-multifrequency signal detection process.

9. The method set forth in claim 8 wherein said step of processing further includes the step of responding to the detection of a dual-tone-multifrequency signal characterizing a request for a particular service by forwarding a message indicative thereof to a destination STM switch.

10. The method set forth in claim 6 further comprising the step of detecting a failure to receive a cell from said interface within a predetermined period of time of receiving a prior cell and supplying a substitute cell to said signal processing function in place of the cell that was not received within said predetermined period of time.

11. The method set forth in claim 6 further comprising the step of detecting a failure to receive a cell from said interface within a predetermined period of time of receiving a prior cell and forwarding a substitute cell for the cell that was not received within said predetermined period of time over a connection extending to another switch of said ATM network.

\* \* \* \* \*